UNITED STATES PATENT OFFICE.

WILLIAM ROSSNAGEL, OF NEWARK, NEW JERSEY.

IMPROVEMENT IN IMITATION HAIR-CLOTH.

Specification forming part of Letters Patent No. 120,331, dated October 24, 1871.

*To all whom it may concern:*

Be it known that I, WILLIAM ROSSNAGEL, of the city of Newark, in the county of Essex and State of New Jersey, have invented a new and useful Improvement in Artificial or Imitation Hair-Cloth; and I do hereby declare that the following is a full, clear, and exact description of the construction and operation of the same, reference being had to the annexed drawing making a part of this specification.

My invention consists in the use of Sisal hemp as a filling in the manufacture of artificial or imitation hair-cloth, and is made in the following manner:

The warp is of cotton, the same as the genuine hair-cloth, and the filling is composed entirely of Sisal hemp. The process of weaving is substantially the same as in the genuine hair-cloths. After the cloth is woven it is dyed; then pressed twice; after which it is varnished, walnut-stain being mingled with the varnish. After the varnish becomes dry it is finished with a fine coat of shellac varnish, when it is ready for use. I find it preferable to apply the varnish with a woolen cloth having a sponge inclosed.

The ingredients and process of forming the die are as follows: First solution—ten pounds extract logwood and six pounds fustic boiled in two hundred and fifty gallons water. Second solution—one and a half pound of bichromate of potash dissolved in the same quantity of cold water. Third solution—one and a quarter pound copperas dissolved in the same quantity of cold water.

The process of dyeing is as follows. The first solution should be lukewarm when the cloth is submerged, and it should remain therein for about fifteen minutes. It should then be taken out and submerged in the second solution, and remain therein for the same length of time. It should then in like manner be submerged in the third solution for the same length of time. This process should be repeated about three times, after which it is dried, and is then ready for the process of finishing.

I am aware of the patent granted to J. J. Comstock and James Aborn, dated May 17, 1870, No. 103,018, for the manufacture of imitation hair-cloth, wherein is claimed the use of the fiber of the stem of the wild plantain tree as a substitute for animal hair in the manufacture of fabrics for purposes for which hair-cloth is suitable. Such is not claimed by me; but

What I claim as new, and desire to secure by Letters Patent, is—

The invention of an artificial or imitation hair-cloth, the filling being composed entirely of Sisal hemp or Manila, and manufactured substantially as herein set forth and described.

WILLIAM ROSSNAGEL.

Witnesses:
OLIVER DRAKE,
ELIAS FRANCIS.

(95)